United States Patent Office 3,383,954
Patented May 21, 1968

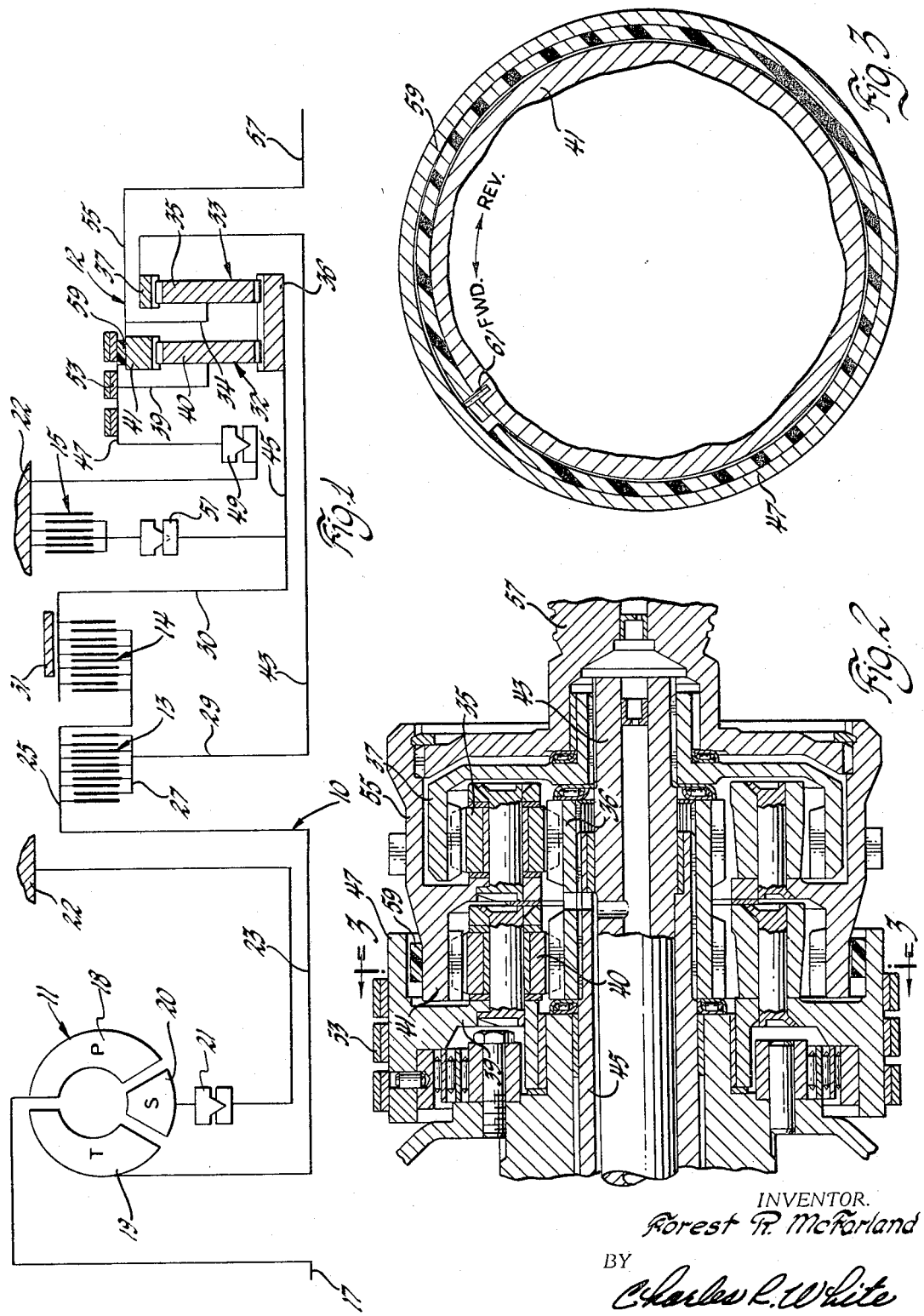

3,383,954
SELF-ENERGIZING RING
Forest R. McFarland, Flint, Mich., assignor to General Motors Corporation, Detroit, Mich., a corporation of Delaware
Filed Dec. 28, 1965, Ser. No. 517,045
10 Claims. (Cl. 74—753)

ABSTRACT OF THE DISCLOSURE

A transmission having planetary gearing providing a plurality of forward drive ratios and a reverse drive ratio and having a one-way friction band disposed between a reaction drum that is connected to a planetary gear carrier and a ring gear connected to the transmission output. The band has one end connected to the ring gear and has a free end portion in frictional engagement with the interior of the drum. This band energizes on attempted relative rotation on the drum and ring gear in one direction to connect these parts with an increased friction force to retard this relative rotation. The band de-energizes on relative rotation of these parts in an opposite direction permitting the ring gear to overrun the drum. The band dampens vibration of the planetary gear train, reduces gear rattle and substantially eliminates reaction noise when the reverse brake is applied to the drum on shifts from neutral to reverse by holding the drum stationary prior to the engagement of the reverse brake.

---

This invention relates to drag rings and in particular to a self-energizing drag ring which is operative on attempted one-way relative rotation between two members to frictionally connect these members for vibration damping and retardation of relative rotation of the members.

Although the drag ring of this invention may be used in many environments, it is particularly useful in power transmissions for reducing gear rattle and the reaction bump resulting from apply of a servo or other mechanism to a reaction mechanism.

The present invention involves a split, one-way drag ring that has a free end and is pinned or otherwise fastened at the other end to a first annular member which may be rotated at high speeds if desired. This drag ring is located between the first annular member and a second annular member which may be parts of a planetary gear set subject to gear rattle. The drag ring allows free relative movement of the members in one direction. However, in attempting relative movement in an opposite direction, the drag ring will tighten on the second member with the frictional forces between the ring and interior of the second member increasing exponentially as the distance from the free end of the ring increases. The load is taken at the fastened end of the drag ring and relative rotation of the two members is restrained to a sufficient degree to prevent gear rattle. Also this invention provides many other advantages including the damping of vibration of the members or of either one of the members when they are frictionally connected in limited degree by the drag ring, and the retardation of rotation of one of the members when the other is grounded. In transmissions, this retardation of rotation is particularly important since the member being retarded from rotation may be a control member of a planetary gear set engageable by a servo actuated brake band or other mechanism for establishing a drive ratio. When the member is held stationary prior to band engagement, the apply force is considerably less than that which would be necessary to similarly hold a control member which is rotating prior to engagement. Consequently, with applicant's device there is a reduced noise level and reduced reaction bump on ratio change when the stationary member is engaged by the brake band. Furthermore, if one of the members is a gear which is subject to gear rattle, this rattle will be suppressed by the friction drag ring which takes up vibrating energy when the frictional connection is established.

One of the features of this invention is to provide a self-energizing one-way drag ring in a planetary gear set. Another feature of this invention is to provide a new and improved one-way friction device for diminishing vibration and gear rattle.

Another feature of this invention is to provide a one-way drag ring for use in a power transmission to reduce gear rattle and reduce reaction bump on establishment of a drive ratio.

Other features, objects and advantages of this invention will appear to those skilled in the art from a reading of the specification and the drawing in which:

FIGURE 1 is a diagrammatic illustration of a transmission incorporating this invention.

FIGURE 2 is a longitudinal, sectional view through the transmission gearing shown diagrammatically in FIGURE 1 further illustrating this invention, and FIGURE 3 is a sectional view taken along lines 3—3 of FIGURE 2 with some particulars illustrated.

Referring to FIGURE 1 in particular, there is illustrated a transmission 10 which includes a converter 11, planetary gearing unit 12, and selectively engageable friction-drive-establishing devices 13, 14 and 15. This transmission includes power input shaft 17, which is coupled to drive pump 18 of the torque converter. The torque converter further includes turbine 19 and stator 20. A one-way brake 21, connected to the transmission case 22, prevents reverse rotation of the stator for converter torque multiplication operation and further permits freewheeling of the stator for converter coupling operation. The turbine drives shaft 23 and connected drum 25.

The friction device or clutch 13 has plates which are alternately coupled to drum 25 and annular support 27 secured to disc 29. Similarly, friction device or clutch 14 has plates alternately coupled to the drum 25 and an annular drum 30. A brake band 31 is selectively engageable with the outer periphery of drum 30 for engine braking of the vehicle when clutch 13 is engaged. Engagement of either or both of these clutches couples the output of the converter to the transmission range gearing 12. As illustrated, this gearing includes first and second planetary gear sets 32 and 33. Gear set 33 has a planetary carrier 34 supporting planet pinions 35 which mesh with the sun gear 36 and ring gear 37. The gear set 32 includes a reaction planet carrier 39 supporting planet pinions 40 which mesh with ring gear 41 and the sun gear 36.

The support disc 29 for clutch 13 is connected to the ring gear 37 by a drive shaft 43 while the drum 30 for clutch 14 is connected to the sun gear 36 by a sleeve shaft 45. Carrier 39 is connected to a drum 47 which may be held for reaction as explained below. As illustrated, a one-way brake 49 is disposed between the drum 47 and the transmission case to prevent reverse rotation of drum 47 and carrier 39, but allows the forward rotation of these elements, as will be appreciated. A second one-way brake 51 is disposed to control rotation of the sleeve shaft 45 and sun gear 36. As further illustrated, the one-way brake 51 may be grounded by application of friction device or brake 15 so that the one-way brake functions to prevent a reverse rotation of the sleeve shaft, but permits the sleeve shaft to rotate forwardly. The drum 47 may be stopped from rotation by application of band brakes 53 for the establishment of a drive which will be further described below. The carrier 34 is connected to a drum 55 that is coupled to a transmission output 57 while the drum 55 is coupled in a similar fashion to the ring gear 41 of the planetary gear set.

As shown in all figures, there is disposed between the inner circumference of the drum 47 and the outer circumference of the ring gear 41 a split ring member 59, which is made of any suitable resilient materials or combination of materials in order to fit closely in drum 47, for frictionally connecting the drum 47 and the ring gear 41 under certain conditions which will be described later in this specification. Materials such as glass-filled nylon, steel, bronze on steel, plastic on steel, or plastic alone, depending upon the frictional loads that will be required of the ring, may be used for the ring member.

It will be seen from FIGURE 3 in particular that the ring is pinned at one of its ends to the outer circumference of the ring gear 41. Since the split ring is preformed in a circular pattern having an external diameter larger than the internal diameter of drum 47 it will, when installed between the ring gear and the drum, tend to spring outwardly to engage drum 47. As shown the outer circumference of the split ring by virtue of its force of recovery to return to its original shape contacts the inner circumference of the drum 47 from the one end up to a position closely adjacent to the place where the ring is pinned in FIGURE 3. Near this point, the ring will be drawn inwardly so that the inner surface of the ring contacts the outer circumference of the ring gear 41 for a short distance.

The drag ring 59, which normally fits against the interior of drum 47, except for the slight relief at the pin 61, has a free end which, due to its fractional contact with the interior drum 47, allows the ring to tightly wrap in the interior of the drum as the drum 47 tries to rotate in the forward direction indicated by the arrow in FIGURE 3. The frictional forces between the band and the drum will increase in a cumulative manner from the free end of the ring at an exponential rate. The reaction of the friction force is taken by the pin 61 which extends into the ring gear 41. Thus, the split ring is self energizing in one direction and functions to provide a frictional connection between the ring and the drum which operates to damp any vibrations and suppress gear rattle. Relative rotation in an opposite direction is not affected by the split ring since it de-energizes as it tends to unwrap from the interior of drum 47.

For forward drive, the clutch 13 is applied and input into the planetary units will be through drive shafts 43 to ring gear 37. Reaction into planetary units taken by the carrier 39 which is held from reverse rotation by automatic operation of the one-way brake 49. With carrier 39 held and input into the ring gear 37, the output shaft 57 will be driven in a forward direction in a low drive ratio. For engine braking in a low range, the brake bands 53 may be applied to drum 47 to thereby hold carrier 39 and prevent the carrier from overruning the engine. Since the ring gear 41 overruns drum 47 in the forward direction, the split ring is not energized and there is no appreciable wear thereon.

For intermediate range operation, the clutch 13 remains engaged and the intermediate range friction-drive-establishing device 15 is applied to retard the reverse rotation of the sun gear 36. With friction devices 13 and 15 applied, input will be through the drive shaft 43 into the ring gear 37 of the planetary gear units. Since the sun gear 36 is retarded from reverse rotation due to the operation of the one-way brake 51, the drum 55 and output 57 will be driven forwardly at reduced ratio and increased speed as compared to the low range drive. To provide engine braking in intermediate drive range, the front band 31 is applied to the drum 30 to prevent the sun gear 36 from overrunning the one-way brake 51. As in low range operation, the ring gear 41 overruns drum 47 in the forward direction so that split ring is not energized. For direct drive, friction devices 13 and 14 are engaged, to lock-up the planetary gear sets for the 1:1 high range drive. In direct drive, ring gear 41 is rotating in a forward direction; carrier 39 carrying pinions 40 which mesh with the teeth 36 and ring gear 31 is a free body except for possible lag due to the slight friction of band 53 on drum 47. In this drive range the carrier 39 is subject to torsional impulses which, in the absence of the drag ring, may cause gear rattle from the teeth of pinions 40 intermittently contacting the teeth of sun gear 36 and the teeth of ring gear 41. However the drag ring of this invention will hold the teeth of the pinions against the teeth of the sun and ring gears since it permits the carrier 39 and the connected drum to lag rearwardly with respect to the ring gear but will prevent the carrier from moving forwardly since the drag ring will become energized connecting the carrier 39 and drum 47 to the ring gear 41 as previously described.

For reverse, friction device 13 is released. Friction device 14 and the band 53 are applied. With the carrier 39 held for reaction and with input into the sun gear 36, the ring gear 41, the connected drum 55, and output 57 are driven in a reverse direction at an increased ratio for a reverse drive. In reverse the larger force applied to energize the drag ring will overcome the frictional force between the drag ring and the drum 47 allowing the ring gear 41 to rotate in the reverse direction. In neutral, all clutches and brakes are released.

Prior to the preesnt invention, garage shifts for neutral to reverse have previously been accompanied by an objectionable reaction bump and other noise which is occasioned by the applying of the brake band to the rotating drum 47. In neutral range, the net effect of the frictional drag or shear of the fluid in the clutches 13 and 14 will cause the sun gear 36 to be driven in a forward direction. This is particularly true when the clutch fluid viscosity is initially high as on cold days. With the sun gear 36 driven forwardly by the fluid shear in friction devices and with the ring gear 41 producing reaction, the carrier 39 will be driven forwardly and the drum 47 will store kinetic energy as a fly wheel; the apply of the band 53 to this rotating mass results in the objectionable bump. However, with the improved friction ring that applicant has provided, the forward rotation of the drum 47 in neutral is effectively prevented by the self energizing operation of the drag ring which will try to unwind and wrap inside of the drum 47. This couples the drum to the ring gear 41 which is stationary due to the fact that the output 57 is grounded. As pointed out before, the tightening of the ring and the drum is cumulative as the distance from the leading edge increases. Band 53 applied to the stationary drum 47 in a garage shift from nuetral to reverse will be quiet and reaction bump will be eliminated or substantially reduced.

From the above description, it will be understood that applicant has provided a new and improved one-way drag which is self-energizing and operates only when needed. It will be further understood that various changes or modifications may be made to the invention which has been disclosed as a single, preferred embodiment. Applicant's invention is not to be limited by the specific embodiment shown and described, but only by the appended claims.

I claim:

1. In a power transmission, a torque transmitting planetary gear unit having first and second relatively rotatable members spaced from each other, friction band means between said members, said band having one end secured to said first member and having a free end portion in frictional engagement with said second member, said friction band means being self-energizing on relative rotation of said members in one direction to frictionally couple said members retarding relative rotation in said one direction and said friction band means being de-energizable in response to relative rotation of said members in an opposite direction to allow continuous relative rotation of said members in said opposite direction and to permit said gear unit to freely transmit torque.

2. The power transmission of claim 1, said friction band means being a split drag ring, fastener means securing said one end portion of said drag ring to said first member, said drag ring having a segment extending from a point adjacent to said fastener means to the free end of said ring in biased contact with the said second member, said ring being self energizing in response to relative rotation of said members in said one direction by wrapping on said second member and exerting an increased frictional force to connect said first and second members and retarding relative rotation of the members in said one direction.

3. The power transmission of claim 2, wherein said first member is a gear, said drag ring when frictionally connecting said gear and said second member being operative to hold the meshing gears of said gear unit in close engagement to reduce gear rattle.

4. The power transmission of claim 2, wherein said second member is a control member of said gear unit, means selectively engageable with said control member to condition said gear unit for a drive ratio, said drag ring when energized on relative rotation of said members in one direction coupling said members through a resisting force of friction sufficient to increasingly retard relative rotation of said members and to reduce vibration and abundant noise.

5. The transmission of claim 2, wherein said members are annular members in a gear unit, said split ring being of an elastic member having an external diameter greater than the internal diameter of said second member, said ring when positioned between said member springing outwardly into biased engagement with part of the inner circumference of said second member to provide a vibration damping frictional connection.

6. The transmission of claim 5, wherein said free end of said drag ring is aligned with and terminates short of said secured end of said drag ring, said ring and said second member being connected by friction forces which increase exponentially from said free end of said ring as said ring wraps in said second member on limited relative movement of said members in one direction.

7. The transmission of claim 1 including an input and output operatively connected to said gear unit, said planetary gear unit having ring and sun gears operatively connected by planet gears, a carrier for said planet gears, said ring gear being said first member, said second member being a reaction drum, said drum having an interior annular surface, means connecting said drum to said carrier, selectively engageable means for coupling said sun gear to said input, braking means selectively engageable with said drum to hold said carrier for reaction and condition said planetary gear set for a predetermined drive ratio, said friction band means being self energizing in response to attempted relative rotation of said drum and said ring gear in one direction to frictionally connect said ring gear and said drum to restrict relative rotation in said one direction prior to the engagement of said braking means with said drum to permit said braking means to engage and hold said drum without excessive noise.

8. In a planetary gear set having sun gear means, ring gear means, planetary gear means meshing with said sun and ring gear means, and carrier means for said planetary gear means; one of said means of said gear set having an external annular surface, another of said means of said gear set having an internal annular surface spaced radially outwardly from said external annular surface, a friction band disposed between said surfaces, fastener means for securing one end of said band to one of said surfaces, said band having a free end portion and having a curved surface which extends from a point adjacent to said fastener means to said free end portion in frictional engagement with the other of said annular surfaces to apply increased frictional force on said last mentioned surface when said band wraps on said last mentioned surface on attempted relative rotation in one direction of said means of said gear set having said radially spaced annular surfaces and thereby tighten the connection between said last mentioned means of said gear set to retard relative rotation thereof in said one direction and to remove the frictional force on said last mentioned annular surface when said band unwraps therefrom in response to relative rotation of said last mentioned means of said gear set in an opposite direction to hold the teeth of said planet gear means against the teeth of said ring and sun gear means to reduce gear rattle.

9. In a torque transmitting planetary gear set having an input and an output, first friction means operatively connected to said gear set and engageable to condition said gear set for a predetermined drive ratio, second friction means operatively connected to said gear set and engageable to condition said gear set for another drive ratio, said gear set having a planetary gear carrier and having a drum operatively connected to said carrier and further having a ring gear disposed within said drum and spaced therefrom, a friction band having an end portion secured to said ring gear and having a free end portion, said band including a curved portion including said free end portion normally urged into frictional contact with said drum, said friction band automatically energizing on attempted relative rotation of said ring gear and said drum in one direction to retard rotation of said drum to reduce reaction noises of engagement of said first friction means with said drum in conditioning said gear set for said predetermined drive ratio, and said friction band being automatically de-energizable on relative rotation of said drum and said ring gear in an opposite direction to permit said ring gear to overrun said drum in said second drive ratio.

10. In a transmission having an input and an output; a planetary gear set operatively connected to said input for providing an underdrive, a direct drive and a reverse drive ratio; plural control means operatively connected to said gear set and engageable to condition said gear set for any selected drive ratio, said gear set having a gear operatively connected to said output, said gear and one of said control means being relatively rotatable with respect to each other in opposite directions of relative rotation, an elastic friction band disposed between said gear and said last mentioned control means which responds to one direction of relative rotation thereof in reverse and direct drive ratios energizing to frictionally connect said gear and said last mentioned control means and which responds to relative rotation of said members in an opposite direction in the underdrive ratio to de-energize to reduce the frictional connection between said gear and said last mentioned control means to allow the gear set to freely transmit torque, said friction band having an external curved surface naturally urged into frictional engagement with the inner surface of said last mentioned control means when said gear set is in a static condition and also having one end portion fixed to said gear and a free end portion aligned with and terminating short of said fixed end portion.

References Cited

UNITED STATES PATENTS

| 1,690,267 | 11/1928 | Barrows et al. | 192—41 |
| 2,300,712 | 11/1942 | Starkey | 192—41 |
| 2,335,848 | 12/1943 | Dodwell | 192—41 |
| 2,479,965 | 8/1949 | Ragsdale | 192—41 |
| 3,318,174 | 5/1967 | Clapp et al. | 74—753 |

DONLEY J. STOCKING, *Primary Examiner.*

THOMAS C. PERRY, *Examiner.*